(12) United States Patent
Bowen, Jr. et al.

(10) Patent No.: US 7,260,062 B2
(45) Date of Patent: Aug. 21, 2007

(54) FLOW CONTROL IN NETWORK DEVICES

(75) Inventors: Hoyt Edwin Bowen, Jr., Cary, NC (US); Patrick Droz, Rueschlikon (CH); Clark D. Jeffries, Durham, NC (US); Lukas Kencl, Prague (CZ); Andreas Kind, Kilchberg (CH); Soenke V. Mannal, Waldachtal (DE); Roman A. Pletka, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 10/325,324

(22) Filed: Dec. 20, 2002

(65) Prior Publication Data
US 2004/0120252 A1    Jun. 24, 2004

(51) Int. Cl.
*H04J 1/16* (2006.01)
*H04J 3/16* (2006.01)
*H04L 12/66* (2006.01)
*H04L 12/28* (2006.01)

(52) U.S. Cl. ............... 370/232; 370/235; 370/253; 370/356; 370/395.43; 370/413; 370/468

(58) Field of Classification Search .......... None
See application file for complete search history.

(56) References Cited
U.S. PATENT DOCUMENTS 6,687,781 B2 * 2/2004 Wynne et al. ............. 710/317
6,822,940 B1 * 11/2004 Zavalkovsky et al. ...... 370/237
6,901,052 B2 * 5/2005 Buskirk et al. ............. 370/235
6,947,750 B2 * 9/2005 Kakani et al. ............. 455/452.2
6,947,998 B2 * 9/2005 Mekkittikul et al. ....... 709/241
7,039,013 B2 * 5/2006 Ruutu et al. ............... 370/235
7,072,295 B1 * 7/2006 Benson et al. ............. 370/230

* cited by examiner

*Primary Examiner*—Chi Pham
*Assistant Examiner*—Melanie Jagannathan
(74) *Attorney, Agent, or Firm*—Joscelyn G. Cockburn

(57) ABSTRACT

Methods and apparatus are provided for controlling flow rates of a plurality of data packet flows into a queue 4 corresponding to a resource 3 of a network device 1. The flows comprise a set 7 of non-responsive flows, and a set 8 of other flows which may comprise responsive flows and/or flows whose responsiveness is unknown. The flow rates are managed in accordance with a queue management scheme such that adjustments are made to each flow rate in dependence on excess bandwidth in the resource, the amounts of the adjustments being dependent on one or more adjustment parameters for each flow. An error signal is generated based on the deviation from a desired allocation ratio of the ratio of the total flow rates into the queue 4 for the sets of flows 7, 8. At least one adjustment parameter for at least one flow is then varied in dependence on the error signal in such a manner as to reduce the aforementioned deviation. A closed-loop control scheme thus operates in conjunction with the underlying queue management scheme to promote fair bandwidth allocation even in the presence of a mix of responsive and non-responsive flows.

41 Claims, 7 Drawing Sheets

| | High Congestion | | Medium Congestion | | Low Congestion | |
|---|---|---|---|---|---|---|
| Simulation Number | Desired UDP Share % | Actual UDP Share % | Desired UDP Share % | Actual UDP Share % | Desired UDP Share % | Actual UDP Share % |
| 1 | 90 | 91.25 | 50 | 49.88 | 20 | 20.26 |
| 2 | 50 | 49.81 | 30 | 29.95 | 15 | 14.81 |
| 3 | 10 | 17.76 | 10 | 11.46 | 10 | 10.06 |
| 4 | 90 | 91.61 | 50 | 49.78 | 20 | 19.85 |
| 5 | 50 | 49.58 | 30 | 29.87 | 15 | 14.63 |
| 6 | 10 | 20.86 | 10 | 12.32 | 10 | 10.02 |
| 7 | 90 | 91.41 | 50 | 49.94 | 20 | 20.02 |
| 8 | 50 | 49.61 | 30 | 29.79 | 15 | 14.97 |
| 9 | 10 | 14.44 | 10 | 13.02 | 10 | 10.03 |

Desired UDP/TCP ratio ———

FLOW CONTROL IN NETWORK DEVICES

TECHNICAL FIELD

This invention relates generally to flow control in data communications networks, and more particularly to methods and apparatus for controlling flow rates into data packet queues in network devices.

BACKGROUND OF THE INVENTION

When any resource of a network device involved in the processing of data packets receives packets at a higher rate than it can process the packets, then packets will back up, effectively giving rise to a queue of data packets. Flow control mechanisms are generally provided to manage the transmission into the queue of data packets from various flows, where a "flow" is some defined set or category of data packets, such as packets from a particular group of sources, or conforming to a particular protocol, or packets requiring a particular class of service for example. In particular, queue management schemes can be implemented to control the flow rate into the queue (i.e. the enqueuing rate or "serviced rate") for each flow according to the availability of bandwidth in the resource. Bandwidth availability is typically assessed by some form of queue length thresholding technique which indicates whether excess bandwidth (i.e. spare or unused bandwidth) is available in operation. Flow rates are then controlled accordingly, with a view to ensuring fair sharing of bandwidth between flows while meeting any guaranteed service specifications for particular flows. For example, Active Queue Management (AQM) schemes such as RED (Random Early Detection) and variations thereof control flow rates by probabilistically dropping input packets (or marking packets to indicate network congestion), the drop probabilities for respective flows being increased or decreased in a defined way based on queue levels. A more recent AQM scheme known as Bandwidth Allocation Technology (BAT) is described in "Bandwidth Allocation for Non-Responsive Flows with Active Queue Management", Bowen et al., Int. Zurich Seminar on Broadband Communications, IZS 2002, February 2002. This scheme belongs to the family of additive-increase multiplicative-decrease (AIMD) control algorithms, and monitors excess bandwidth by sensing not only queue levels but also rates of queue-level changes.

Queue management schemes thus control flow rates based on local congestion levels, adjusting flow rates in dependence on excess bandwidth in the particular local resource to which the queue corresponds. Additional flow control mechanisms may also operate on a network-wide level. In particular, certain network protocols are classed as "responsive". Responsive protocols provide some mechanism for adjusting flow rates based on events, such as dropping or marking of packets, indicative of congestion status occurring elsewhere in the network. For example, Internet protocols such as TCP (Transport Control Protocol) incorporate an end-to-end back-off mechanism whereby devices send data at lower rates when congestion is sensed. Depending on the particular mechanism employed, different responsive protocols can provide different levels of responsiveness, but all provide for some degree of congestion control at wider-than-local level. Other network protocols such as UDP (User Datagram Protocol) are classed as non-responsive. These protocols continue sending data at the same rate regardless of congestion in the network. Non-responsive protocols thus rely on local mechanisms to handle congestion control.

A typical network may support traffic conforming to a variety of different protocols, and may thus carry both responsive and non-responsive traffic. In general, therefore, it is desirable for network flow control mechanisms to deal efficiently and in a fair manner with a mix of different traffic types.

SUMMARY OF THE INVENTION

The present invention is predicated on the realization that serious problems arise with existing queue management schemes when dealing with a mix of responsive and non-responsive flows. In particular, responsive flow rates are automatically reduced by the responsive back-off mechanism, whereas non-responsive flow rates are not. This means that non-responsive flows can "choke out" responsive flows, taking all the excess bandwidth at the local level. This is directly contrary to the underlying objective of achieving fair bandwidth allocation between all flows handled by the queue management system.

One aspect of the present invention provides a method for controlling flow rates of a plurality of data packet flows into a queue corresponding to a resource of a network device, where the plurality of flows comprises a set of non-responsive flows and a set of other flows. The method comprises:

managing the flow rates in accordance with a queue management scheme such that adjustments are made to each flow rate in dependence on excess bandwidth in the resource, the amounts of said adjustments being dependent on one or more adjustment parameters for each flow;

generating an error signal dependent on the deviation from a desired allocation ratio of the ratio of the total flow rates into the queue for said sets of flows; and varying at least one adjustment parameter for at least one flow of at least one of said sets in dependence on the error signal so as to reduce said deviation.

Thus, methods embodying the invention control flow rates into a queue (i.e. the serviced rates) for a plurality of flows which comprises a set of non-responsive flows and a set of other flows. Each set may comprise one or more flows, so in the limiting case the method may operate for only two flows. The first set comprises flows which are known to be non-responsive. The second set comprises other flows. These other flows may be those flows which are known to be responsive flows. However, the responsiveness of all flows handled by the flow control system may not be known in all embodiments. In such cases the second set may include those flows whose responsiveness is unknown. In general, therefore, the second set may comprise those flows which are not known to be non-responsive. In any case, the serviced rates for the flows are controlled via a queue management scheme which adjusts flow rates based on bandwidth availability, each flow rate being adjusted by amounts dependent on one or more adjustment parameters for that flow. During operation of the queue management process, an error signal is generated based on the difference between a desired allocation ratio and the ratio of the total serviced rates for the two flow-sets. This error signal thus provides an indication of the deviation of the bandwidth allocation between the two sets of flows from a desired value. The error signal is then used to vary at least one of the adjustment parameters used in the queue management process in such a manner as to reduce this deviation. Thus, embodiments of the invention provide a closed-loop control scheme, operating in conjunction with an underlying queue management scheme, which alleviates the problem caused by non-responsive flows discussed above. Fair bandwidth allocation can thus be achieved in embodiments of the invention even in difficult traffic situations where a mix of both non-responsive and responsive flows must be managed. Overall, therefore, methods embodying the invention offer significantly improved flow control compared to prior systems.

It will be appreciated by those skilled in the art that the queue managed by the queue management process may be a real queue (e.g. a sequence of data packets in a buffer memory) or may be a logical queue associated with the resource, where the logical queue represents a logical abstraction of the operation of the resource in question. Thus the queue may or may not map to a single piece of memory. Equally, the resource to which the queue corresponds may be any resource associated with queuing of data packets. As a simple example, the resource in question could be a memory item such as a buffer, or multiple memory items such as a set of buffers. Alternatively, for example, the resource might simply be control logic for processing packets in some way, the operation of which can be abstracted as a logical queue. In general, therefore, the resource in question may be any device resource for which the packet handling throughput can be represented, whether directly or by logical abstraction, as a queue. It will also be appreciated that the availability of excess bandwidth in the resource can be assessed in a variety of ways depending on the particular queue management scheme employed. For example excess bandwidth might be assessed based on queue occupancy or some function thereof, or based on overall input versus output rates, or indeed any other measure of use of the resource.

The error signal may be derived in various ways based on the deviation between the actual and desired allocation ratios for the two sets of flows. The term "signal" is used here in the broadest sense. For example, the error signal may simply be a discrete value which is updated periodically in operation. In particular embodiments, determination of the actual allocation ratio (i.e. the ratio between the total serviced rates for the two flow-sets) and/or the error signal may involve some form of averaging process.

In general, depending on the particular adjustment parameters employed in the queue management scheme, one or more adjustment parameters for one or more flows may be varied in dependence on the error signal. In preferred embodiments, simplicity of operation combined with particularly effective control of the overall bandwidth allocation is achieved by varying at least one adjustment parameter for each flow of only one of said sets. Most preferably, a single adjustment parameter is varied for each flow of only one of said sets. In the particularly preferred embodiments described below, the queue management process is performed according to the BAT scheme wherein each flow rate is increased by an amount dependent on an increase parameter when excess bandwidth is available, and decreased by an amount dependent on a decrease parameter when excess bandwidth is not available. Particularly efficient operation is achieved in these preferred embodiments by varying the decrease parameter for each flow of the set of non-responsive flows.

In embodiments where the flow rates are periodically adjusted with a first period in the queue management process, the variation of adjustment parameters in dependence on the error signal is preferably performed periodically with a second period greater than the first period. The second period here is preferably multiple times the first period, for example at least an order of magnitude greater than the first period, and more preferably at least two orders of magnitude greater than the first period. In the particularly preferred embodiments detailed below, the variation of adjustment parameters is performed with a period three orders of magnitude greater than the period of flow rate adjustments by the queue management process. Operating the parameter variation process on a longer time scale than the queue management process inhibits any potential conflict between the two processes, so that the queue management process can operate substantially as usual, with the slower-rate parameter variation serving as a refinement to this process to improve the resulting bandwidth allocation as necessary. Various other preferred features of flow control methods embodying the invention will be illustrated by the specific examples described hereinafter.

A second aspect of the present invention provides apparatus for controlling flow rates of a plurality of data packet flows into a queue corresponding to a resource of a network device, said plurality of flows comprising a set of non-responsive flows and a set of other flows. The apparatus comprises:

a queue manager for managing said flow rates in accordance with a queue management scheme such that adjustments are made to each flow rate in dependence on excess bandwidth in the resource, the amounts of said adjustments being dependent on one or more adjustment parameters for each flow; and an adjustment controller for controlling at least one adjustment parameter for at least one flow of at least one of said sets, the adjustment controller being arranged to generate an error signal dependent on the deviation from a desired allocation ratio of the ratio of the total flow rates into the queue for said sets of flows, and to vary said at least one adjustment parameter in dependence on the error signal so as to reduce said deviation.

It is to be understood that, in general where features are described herein with reference to a method embodying the invention, corresponding features may be provided in accordance with apparatus embodying the invention, and vice versa.

A third aspect of the present invention provides a network device for processing data packets in a communications network, the device having a resource which is associated with a queue of data packets, and flow control logic for controlling flow rates of a plurality of data packet flows, comprising a set of non-responsive flows and a set of other flows, into the queue, wherein the flow control logic comprises a queue manager and an adjustment controller as defined above for the second aspect of the invention.

A further aspect of the invention provides a computer program for causing a processor of a network device to perform a flow control method as hereinbefore described.

BRIEF DESCRIPTION OF THE DRAWINGS

Preferred embodiments of the invention will now be described, by way of illustrative and non-limiting example, with reference to the accompanying drawings in which.

DESCRIPTION OF PREFERRED EMBODIMENTS

Flow control systems embodying the invention may be employed in a variety of network devices such as switches, routers, bridges, traffic shapers, load balancing devices, middleboxes, and devices incorporating firewalls for example. In general the flow control systems to be described may be employed in any device in which management of queues is required. In a typical network device such as a router, incoming data packets received by the device undergo various processing stages, for example buffering in the medium access control components, packet classification and transmission across the internal switching fabric, before being forwarded on across the network. Packets may be queued at various stages of this process pending processing by a particular device resource. Flow control systems embodying the invention can be employed at any one of these stages to protect the resource from overload under conditions of congestion. A particular example of such a flow control system will now be described with reference to FIGS. 1 to 3.

Figure 1:
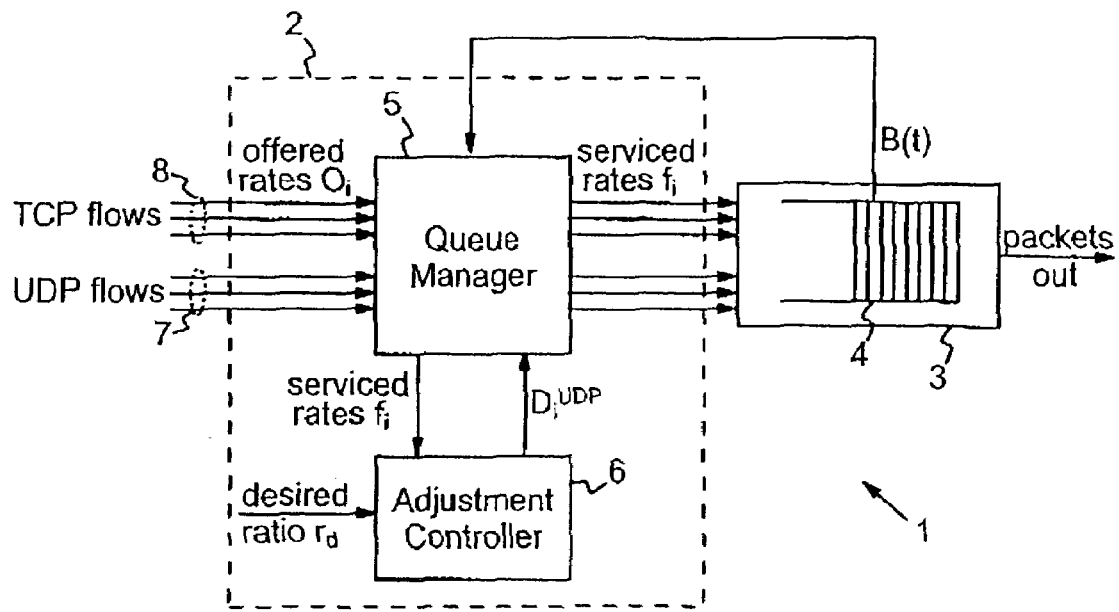
FIG. 1 is schematic representation of a network device incorporating a flow control system embodying the invention.
Figure 2:
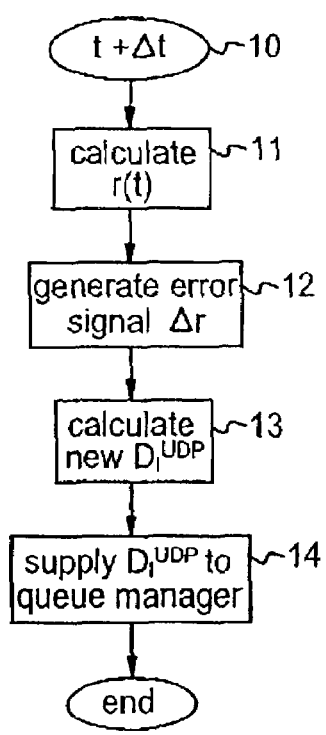
FIG. 2 is flow chart illustrating operation of an adjustment controller of the FIG. 1 device.

FIG. 1 is a simplified schematic of a network device 1 showing the main elements of the device involved in operation of the flow control system. As illustrated, the device 1 includes flow control apparatus, indicated generally at 2, for controlling the flow rates of a plurality of flows into a queue corresponding to a device resource. In this simple example, the resource to be protected is a buffer memory 3 which contains the queue 4 of data packets to be managed by the system. Flow control apparatus 2 includes a queue manager 5 which receives the data packets of the various flows and transmits packets into queue 4 at controlled rates for each flow. In particular, queue manager 5 manages the flow rate into the queue, i.e. the serviced rate, for each flow in accordance with a queue management scheme wherein adjustments are made to each flow rate based on excess bandwidth. In this embodiment, queue manager 5 implements the BAT algorithm wherein excess bandwidth is determined as a function of queue occupancy as detailed below. The availability of excess bandwidth is indicated by an excess bandwidth signal B(t) which is represented schematically in the figure as a feedback signal from queue 4. Flow control apparatus 2 also includes an adjustment controller 6 for controlling the values of particular parameters used in the queue management process as described in detail below. In general, flow control apparatus 2 can be implemented by suitably configured control logic, comprising hardware or software or a combination thereof. For example, apparatus 2 can conveniently be implemented by a network processor running software which configures the processor to perform the functions described. Suitable software will be apparent to those skilled in the art from the description herein. (Of course, while such a processor may be preconfigured with appropriate software, the program code constituting such software could be supplied separately for loading in a network device to configure the processor to operate as described. Such program code could be supplied as an independent element or as an element of the program code for a number of control functions, and may be supplied embodied in a computer-readable medium such as a diskette or an electronic transmission sent to a network operator).

The flows to be controlled by apparatus 2 are notionally divided into two distinct sets which are treated differently in operation of the flow control method to be described. The first set comprises those flows which are known to be non-responsive. The second set comprises those flows which are known to be responsive, and/or those flows whose responsiveness is unknown and which are therefore considered as potentially responsive. For the sake of simplicity, operation of this embodiment will be described for a mix of TCP and UDP flows, whereby the UDP flows make up a set 7 of non-responsive flows, and the TCP flows make up a set 8 of responsive flows as indicated in FIG. 1. (It will be appreciated by those skilled in the art that UDP flows may be classified as responsive in some circumstances, where an overlying application imposes some responsive mechanism on the flows. The UDP flows are simply used here as a convenient example of non-responsive flows, so for the present purposes the UDP flows are classed as non-responsive). Each flow is received by queue manager 5 at an input flow rate, or "offered rate", $O_i$. Queue manager 5 periodically calculates a transmit fraction $T_i$ for each flow generally in accordance with the BAT scheme as described in the document referenced above. Packets are then randomly dropped to achieve a serviced rate of $T_i.O_i$ for the flow. According to the BAT scheme employed in queue manager 5, calculation of the transmit fractions is performed with a period dt, the transmit fraction $T_i$ for each flow at time (t+dt) being given by:

| $T_i(t+dt) =$ | min(1, $T_i(t) + w$) | if | $f_i(t) < f_i min$ |
|---|---|---|---|
| | $T_i(t)(1 - w)$ | else if | $f_i(t) > f_i max$ |
| | min(1, $T_i(t) + C_i * B_{avg}(t)$) | else if | $B(t) = 1$ |
| | max(0, $T_i(t)(1 - D_i * O_i(t))$) | otherwise | | where: $f_i(t) = T_i(t) * O_i(t)$ is the serviced rate for the flow at time t;

w is a predetermined constant for the flow (0<w<1);

$f_i min$ and $f_i max$ are the guaranteed minimum and maximum serviced rates for the flow;

$B_{avg}(t)$ is the exponential weighted moving average of B(t);

$O_i(t)$ is the offered rate for the flow at time t; and the parameters $C_i$ and $D_i$ are, in the basic BAT scheme, predetermined constants for the flow.

The excess bandwidth signal B(t) is given by:

| B(t) = | 1 | if | $Q(t) < q_{min}$ |
|---|---|---|---|
| | 0 | else if | $Q(t) > q_{max}$ |
| | 1 | else if | $dQ(t)/dt < d_{min} < 0$ |
| | 0 | otherwise | | where Q(t) is the total queue length at time t, and $q_{min}$, $q_{max}$ and $d_{min}$ are predetermined thresholds. It can therefore be seen that excess bandwidth is deemed to be available (i.e. B(t)=1) when the queue length is below the threshold $q_{min}$ and when the rate of decrease of the queue length is greater than the threshold rate $d_{min}$. For serviced rates $f_i(t)$ between the minimum and maximum guaranteed rates $f_i$min and $f_i$max for the flow, the BAT scheme adjusts the serviced rate, via adjustment of the transmit fraction $T_i$, in dependence on excess bandwidth. The amounts of these adjustments depend, inter alia, on the values of the adjustment parameters $C_i$ and $D_i$. In particular, if excess bandwidth is available (B(t)=1), then the serviced rate is increased linearly by an amount dependent on the increase parameter $C_i$. If excess bandwidth is not available (B(t)=0), then the serviced rate is decreased exponentially by an amount dependent on the decrease parameter $D_i$.

As noted above, in the basic BAT scheme of the prior art, the increase and decrease parameters $C_i$ and $D_i$ are constants specified for each flow. In the present embodiment, however, the decrease parameter $D_i$ for each of the non-responsive, UDP flows 7 is varied with time. The adjustment controller 6 of FIG. 1 monitors the serviced rates $f_i$ for all flows and uses these, together with a desired bandwidth allocation ratio $r_d$, to vary the values of $D_i$ for the UDP flows. The desired ratio $r_d$ here may be set by a system operator, or supplied by resource management software (not shown) where provided for the system. The general operation of the adjustment controller 6 in this process is indicated in the flow chart of FIG. 2. The variation of the UDP decrease parameters $D_i^{UDP}$ is performed periodically with a period $\Delta t$ which is greater than the period dt. Thus, the parameter variation process commences at every time (t+$\Delta t$) as indicated by step 10 of FIG. 2. In step 11, the adjustment controller calculates a value for the current bandwidth allocation ratio r(t) based on the serviced rates $f_i$ received from queue manager 5. This ratio r(t) is the ratio of the total serviced rate for all UDP flows 7 to the total serviced rate for all TCP flows 8, and is conveniently calculated by averaging a plurality of measurements taken over the preceding period $\Delta t$. In particular, the serviced rates $f_i$ for all flows may be sampled periodically by controller 6 during the period $\Delta t$. With each sampling, the individual rates for the UDP and TCP flows are summed separately to give the total UDP and TCP flow rates, and the ratio of these total rates is recorded by controller 6. The value of r(t) for the current period $\Delta t$ is then calculated in step 11 of FIG. 2 by averaging the recorded ratios over the number of samplings. Next, in step 12 the adjustment controller compares the current allocation ratio r(t) with the desired ratio $r_d$ to generate an error signal $\Delta r$ dependent on the deviation between these two values. In the present embodiment, the error signal is a normalized value given by $\Delta r=(r_d-r(t))/r_d$. In step 13, controller 6 then calculates new values for the decrease parameters $D_i^{UDP}$, the changes to the old $D_i^{UDP}$ values being determined so as to reduce the difference between the desired and actual allocation ratios $r_d$ and r(t). The particular way in which the new $D_i^{UDP}$ values are calculated will be described in more detail below. Finally, in step 14 the new $D_i^{UDP}$ values are supplied to queue manager 5 for use in the subsequent queue management process. The parameter variation process is then complete until the next period $\Delta t$ has elapsed, whereupon the control process is repeated.

It can be seen that the operation of adjustment controller 6 effectively provides a closed-loop control process for controlling the bandwidth allocation r(t) between the responsive and non-responsive flows via variation of the decrease parameters for the non-responsive flows. In particular, the decrease parameters are varied so as to bring the actual allocation ratio closer to the desired value $r_d$. The particular way in which the $D_i^{UDP}$ values are varied here to achieve this will now be explained, commencing with a conventional control engineering approach.

Figures 3, 4:
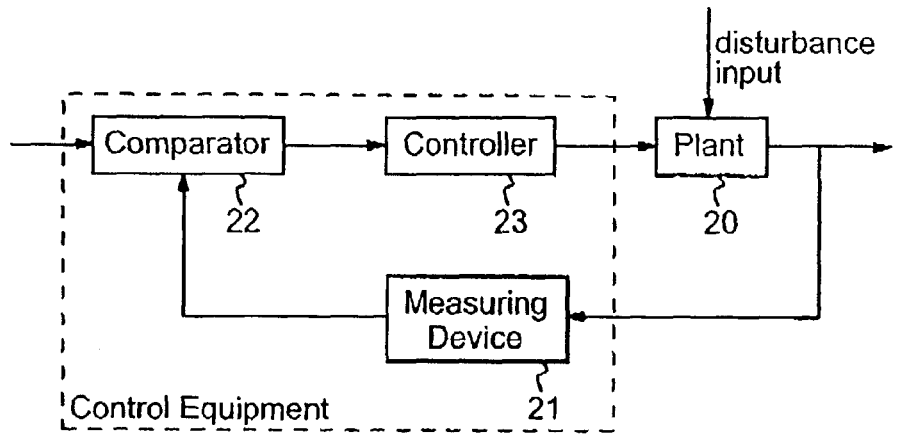
FIG. 3 is a block diagram of an elementary control system.
FIG. 4 is a table giving simulation results for a flow control system embodying the invention under three different congestion conditions.

FIG. 3 illustrates the key elements of an elementary control loop which can be compared to the flow control process performed in device 1. In the present flow control system, the plant 20 of FIG. 3 corresponds to buffer 3 in which incoming traffic is enqueued in queue 4 and, after a certain delay, dequeued. The measuring device 21 of FIG. 3 records required system information such as, in the present case, serviced rates and transmit fractions. The comparator tool 22 evaluates the control error, i.e. the difference between the desired and actual values. In the present case, this is the error signal $\Delta r$ because we are concerned with only one controlled variable and define its state by the value of the control error. The controller 23 of FIG. 3 evaluates the value of the controlled variable according to certain defined principles. This signal and the disturbance input (e.g. oscillations of the offered load) are affecting the plant. The controller functions to produce a manipulated variable, counteracting the effects of the disturbance input while keeping the plant in a desired state.

For the present example we select a controller belonging to the PID (Proportional, Integral and Derivative) family for several reasons:

the periodic calculation efforts required by this family are comparatively low;

while an extensive model of the system might be considered desirable, in contrast to a model-predictive control scheme or observer theory this is not strictly required in the present case;

despite its comparatively simple structure, this groups of controllers can achieve excellent results.

The equation describing an ideal PID controller is as follows:

$$y(t) = K_R\left[x_d(t) + \frac{1}{T_N}\int_{t_0}^{t} x_d(t)\,dt + T_V \frac{dx_d(t)}{dt}\right] \quad (1)$$

where y(t) represents the manipulated variable and $x_d(t)$ the control error, both time-dependent variables, and $K_R$, $T_N$ and $T_V$ are constants. The terms in the square brackets are, from left to right, the proportional, integral and differential influences.

Since the present flow control system is not continuous in time, we use the discrete notation of Equation (1) above. This is obtained by: (a) differentiation with respect to time of Equation (1); (b) approximation of the derivatives by using backward differences; and (c) solving for the actual value of the manipulated variable. The following equation with general coefficients is thereby obtained:

$$y_k = y_{k-1} + b_0 \cdot x_{d,k} + b_1 \cdot x_{d,k-1} + b_2 \cdot x_{d,k-2} \quad (2)$$

With selection of the parameters $b_0$, $b_1$, and $b_2$ one can determine basic properties of the controller. The present approach is based on an integral controller, one obtained from Equation (2) with $b_1$, $b_2 \equiv 0$:

$$y_k = y_{k-1} + b_0 \cdot x_{d,k} \quad (3)$$

because this gives an additional reduction in structure as well as in calculation effort. Maintaining the integral term ensures that the steady-state error is very small, theoretically zero.

In the present flow control system, $D_i^{UDP}$ is the manipulated variable $y_k$ and the control error $x_{d,k}$ is the error signal $\Delta r$ described above. Thus, using Equation (3) we obtain:

$$D_i^{UDP}(t+\Delta t)=D_i^{UDP}(t)+b_0 \cdot \Delta r \quad (4)$$

To match the influence of the control-error signal to the current state of $D_i^{UDP}$ we define $b_0 = \beta \cdot D_i^{UDP}(t)$, $\beta<0$, to obtain the general version of our controller:

$$D_i^{UDP}(t+\Delta t)=D_i^{UDP}(t)+\beta \cdot D_i^{UDP}(t) \cdot \Delta r \quad (5)$$

Thus, adjustment controller 6 calculates the new value of $D^{UDP}$ for each flow in accordance with Equation (5). The parameter $\beta$ could be set to a constant value for all or individual flows if desired, and suitable values will be apparent to those skilled in the art. In particularly preferred embodiments, however, the value of $\beta$ is selected in dependence on the absolute value of the error signal $\Delta r$ as discussed further below. It can be seen from Equation (5) that the value of the decrease parameter $D_i^{UDP}$ is varied in an appropriate manner. If the current bandwidth allocation ratio $r(t)$ is greater than the desired ratio $r_d$ (i.e. too much bandwidth is allocated to UDP traffic) the error signal $\Delta r$ will be negative. Since $\beta<0$, the value of $D_i^{UDP}$ will be increased by Equation (5), i.e. $D_i^{UDP}(t+\Delta t)>D_i^{UDP}(t)$. Consideration of the BAT algorithm defined earlier shows that an increase in $D_i^{UDP}$ results in a decreased transmit fraction $T_i$. Thus, the bandwidth share of UDP flows will be reduced, and the share of TCP flows increased, resulting in a smaller ratio $r(t)$ and reducing the absolute value of the error signal. If the error signal $\Delta r$ is reduced to zero, $D_i^{UDP}$ is not adjusted. This is intentional since the system is then exactly in the desired state and there is temporarily no need for adjustment.

Figure 5A:
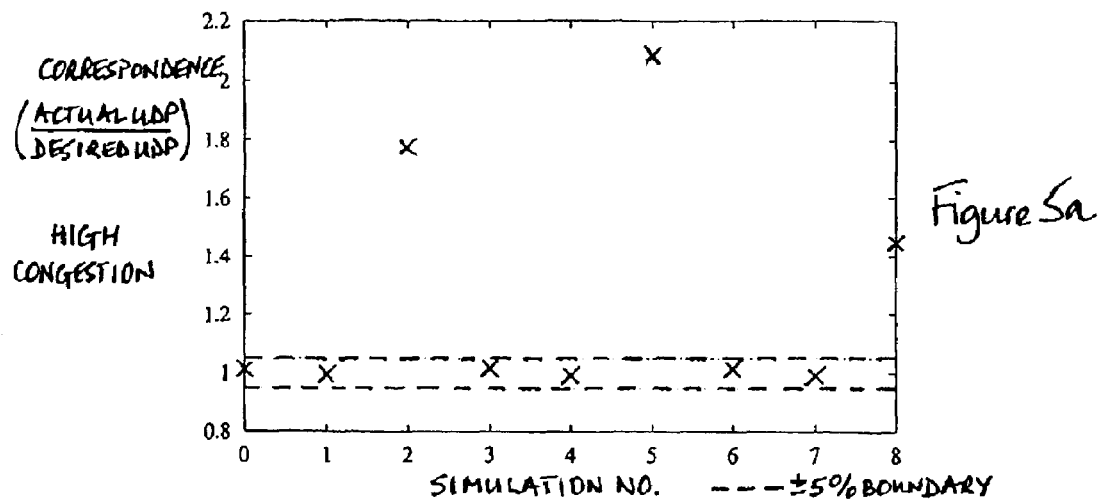
FIGS. 5a, 5b and 5c are graphical representations of the results of FIG. 4 for the three congestion conditions.
Figure 5B:
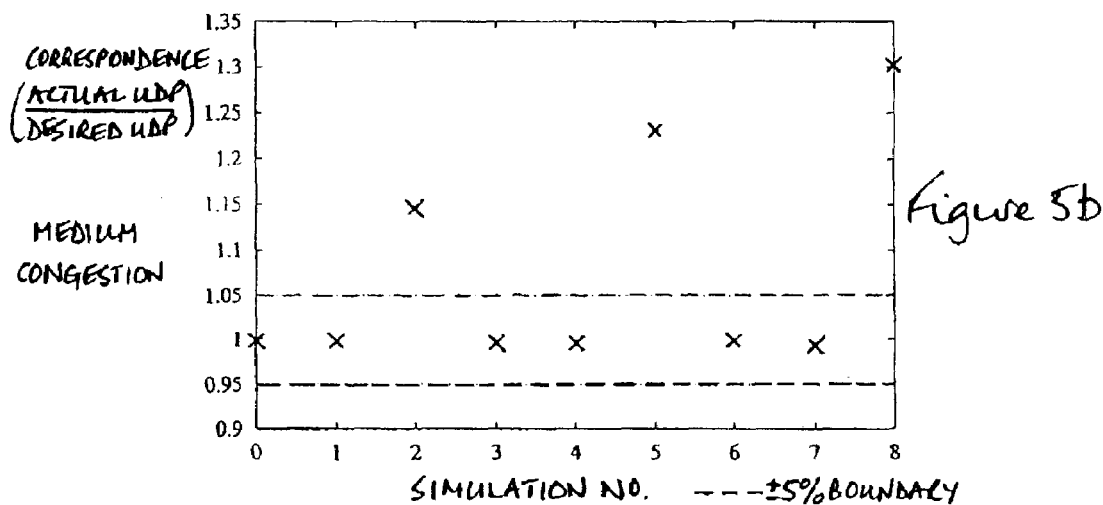
Figure 5C:
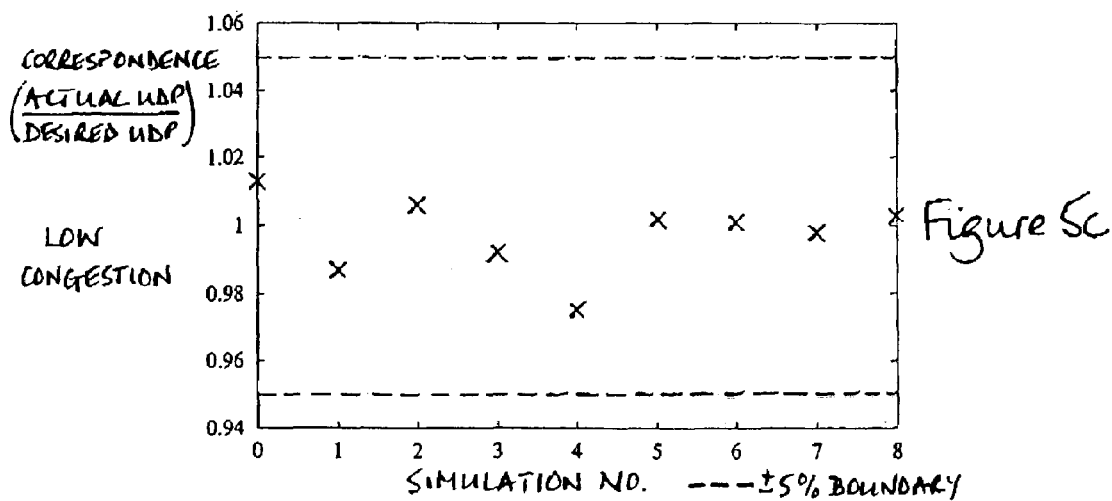

The efficiency of the above flow control system in bandwidth allocation can be seen from a simple simulation using one UDP flow and a large number of concurrent TCP flows, with one bottleneck link using BAT as the queue management scheme as above. The system was tested under three different congestion conditions, high, medium and low congestion, where the congestion level was defined by the amount of UDP offered load. The high congestion condition was represented by UDP offered loads of 200, 150 and 100 Mbits/s. The medium congestion condition was represented by UDP offered loads of 80, 65 and 50 Mbits/s. The low congestion condition was represented by UDP offered loads of 40, 30 and 20 Mbits/s. The capacity of the shared outgoing link, equal to the maximum rate at which the queue 4 is drained, is 100 Mbits/s. For each of the offered loads, three different desired allocation ratios were tested, and the actual bandwidth share of the UDP flow compared with the desired UDP share to determine the degree of correspondence. The results of this simulation are presented in the table of FIG. 4, where simulations 1 to 9 progressed through the aforementioned offered loads from highest to lowest. These results are also illustrated graphically in the plots of FIGS. 5a, 5b and 5c for the high, medium and low congestion states respectively. It can be seen from these figures that, for the high and medium congestion states, a high degree of correspondence is achieved between the actual and desired UDP shares, with discrepancies only for the 10% desired UDP share. For the low congestion state excellent correspondence is achieved for all desired allocation ratios. Similarly good results have been achieved in simulations using a proportional-plus-integral controller in the parameter variation control loop, though the integral controller is preferred here for overall effectiveness combined with simplicity of operation. Overall, effective flow control is provided, with improved bandwidth allocation as compared with BAT flow control alone. Comparative results demonstrating improvements over basic BAT systems will be given below following discussion of some additional improvements which can be incorporated in embodiments of the invention. Preferred features for improving the operation for small shares of non-responsive traffic are among the improvements presented.

In a first modification to the above embodiment, a maximum limiting value is applied to the variation of the decrease parameter $D_i^{UDP}$ for each flow. This limitation is desirable due to the way in which $D_i$ affects the transport probability $T_i$. Reviewing the critical term of the BAT algorithm:

$$T_i(t+dt)=\max(0, T_i(t)(1-D_i \cdot O_i(t)))$$

it is clear that $T_i(t+dt)=0$ for $D_i$ larger than some given value ($O_i(t)$ is generally normalized to the maximum offered load to give a value much smaller than unity). To avoid unnecessary increase of $D_i$ in such circumstances (which would result in a longer time to reduce $D_i$ when small values are subsequently needed), $D_i$ is preferably limited to $D_i \in [0, D_{max}]$. The limiting value $D_{max}$ can be operator-set as appropriate for a given system, and in general will depend on the normalization being used for ease of implementation. In the preferred embodiment described here $D_{max}$ is set at 5000. The effect of this limitation has been tested in a simulation environment generally as before wherein:

the desired ratio $r_d$=0.15;
we start at t=5 s in a very high congestion state (200 Mbits/s of UDP traffic); and
at t=30 s a reduction of UDP offered load to a low congestion state (30 Mbits/s of UDP traffic) occurs.

Figure 6A:
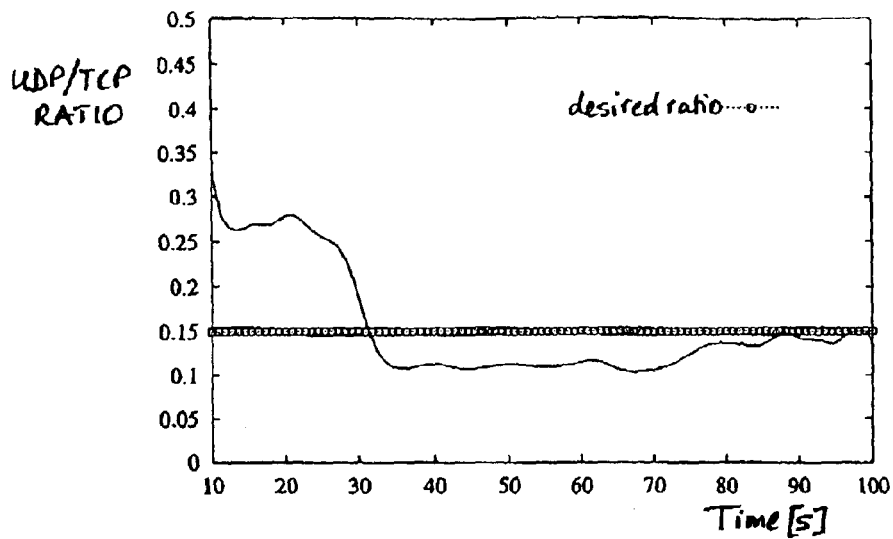
FIGS. 6a and 6b show the results of a simulation demonstrating an improved embodiment of the flow control system.
Figure 6B:
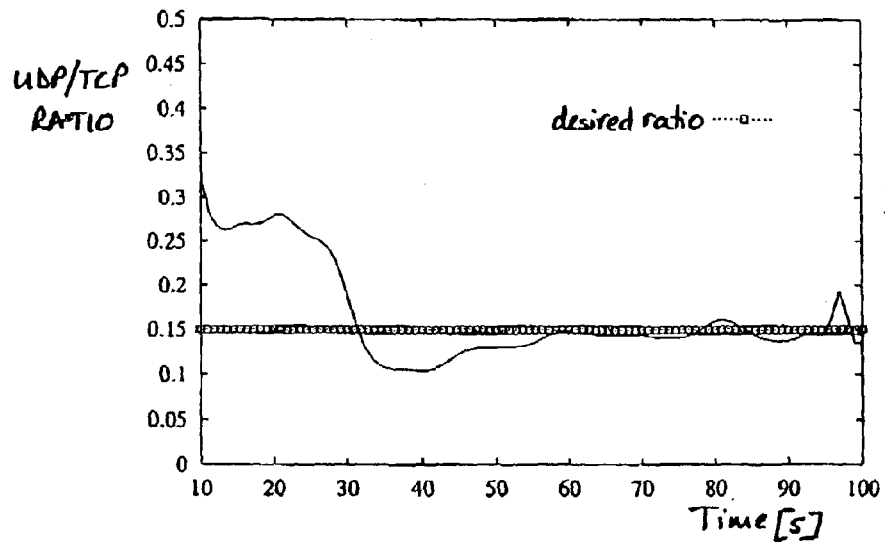

The results of the simulation are shown in the graphs of FIGS. 6a and 6b, where FIG. 6a shows the results without limitation of $D^{UDP}$, and FIG. 6b the results with limitation of $D^{UDP}$ by $D_{max}$=5000. The initial high congestion state combined with the low desired ratio forces the integral controller to increase $D^{UDP}$. If no limitation is set then the value of $D^{UDP}$ can increase to a very high value. Subsequently when the offered load has been reduced significantly, a smaller value of $D^{UDP}$ is required to match the desired ratio. If the initial value of $D^{UDP}$ is then very high, a large reduction is necessary and the controller takes longer to effect the adjustment. Applying the limiting value $D_{max}$ significantly reduces this time frame as demonstrated in FIGS. 6a and 6b.

In an alternative embodiment, the maximum limiting value $D_{max}$ for a flow could be determined via a dynamic process. In particular, by solving $(1-D_i \cdot O_i(t))=0$ for $D_i$ the adjustment controller can determine the appropriate upper limit for $D_i$ for any given offered rate $O_i(t)$. The additional processing effort required to implement this process may be worthwhile in systems with widely distributed offered flow rates. Usually, however, a constant value of $D_{max}$, appropriately set for all or individual flows, will be deemed sufficient, and suitable values will be apparent to those skilled in the art.

Figure 7:
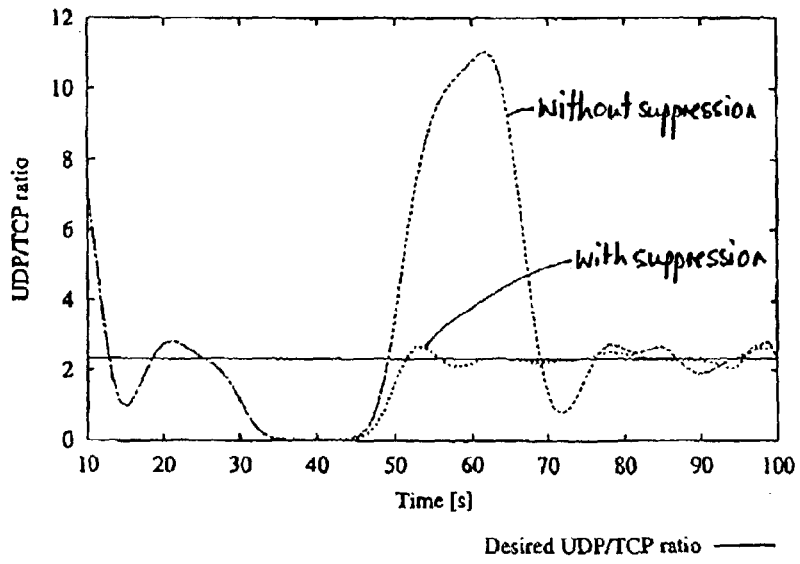
FIG. 7 shows the results of a simulation demonstrating another improved embodiment of the flow control system.

A further improvement in controller operation can be achieved by suppressing the parameter variation process at appropriate times. In particular, the parameter variation process can be suppressed while the offered flow rate $O_i$ for a flow is less than a minimum threshold rate for that flow. For example, although minimum bandwidth is generally assured as a Quality-of-Service item, no flows can be forced to occupy this bandwidth. During periods when this occurs, i.e. for flow rates <$f_i$min, the operation of BAT is such that terms including $D_i$ are ignored. In the embodiments described thus far the adjustment controller would continue trying to match the desired ratio by adjustment of $D_i$. Thus $D_i$ could decrease to zero. When the offered load subsequently increases, the value of $D_i$ may be far from the desired operating point. There will then be a delay while the controller adjusts the value of $D_i$ back to an appropriate value. To address this problem, in preferred embodiments the usual parameter variation process is suppressed while the offered flow rate $O_i$ for a flow is below the minimum assured rate $f_i$min for that flow, i.e. $O_i(t)<f_i$min. In such embodiments, therefore, the adjustment controller 6 may receive not only the serviced rates $f_i$ from queue manager 5 as shown in FIG. 1, but also the offered rates $O_i$ of the UDP flows. Alternatively, controller 6 may receive the transmit fractions $T_i$ of the UDP flows from queue manager 5, and calculate the offered rates $O_i^{UDP}$ from the transmit fractions $T_i$ and the serviced rates $f_i$. (Note that, while the suppression point could be determined here based on the serviced rate $f_i$ (i.e.$f_i(t)<f_i$min), using the offered rate is preferred. Since we want to guarantee the minimum rate at any time, the parameter variation procedure can be suppressed as soon as the offered rate falls below the minimum, and should be resumed as soon as there might be any packet drops, i.e. the offered load is higher than the minimum. It can happen that the transmit fraction according to $T_i(t+dt)=\min(1, T_i(t)+w)$ is not unity, so the serviced rate is still below the minimum, but the offered load may have increased dramatically in the meantime so that further parameter control is required.) While the parameter variation process is suppressed for a flow, in some embodiments the value of $D_i$ is maintained at its last-calculated value, this value then being the starting value when the parameter control procedure is resumed. The graph of FIG. 7 demonstrates the effect of this process in a simple simulation, the deviation of the UDP/TCP allocation ratio from its desired value being shown when suppression of parameter control is not implemented and also when suppression is implemented. The beneficial effect of the suppression process can be clearly seen from this figure.

In other embodiments, suppression of the parameter control process may be performed while the total offered rate for the set of non-responsive flows is below a certain threshold value. In particular, suppression points can be defined by:

$$f_{UDP,critical}=r_d*\text{maximal link bandwidth}/(1+r_d)$$

$$f_{TCP,critical}=\text{maximal link bandwidth}/(1+r_d)$$

where the maximal link bandwidth is the maximum rate at which the queue 4 is drained. $r_d$ is the desired ratio as before, and in general can be derived based on any kind of fairness definition, e.g. max-min fairness. Thus, the sum of $f_{UDP,critical}$ and $f_{TCP,critical}$ corresponds to the maximal link bandwidth, and the ratio of $f_{UDP,critical}$ to $f_{TCP,critical}$ is $r_d$. Let $O_{UDP,total}$ be the total offered rate of the set of non-responsive flows and $O_{TCP,total}$ the total offered rate of the set of responsive flows. If both $O_{UDP,total}>f_{UDP,critical}$ and $O_{TCP,total}>f_{TCP,critical}$ then the present flow control system can operate to drive the total serviced rates for the two sets of flows to $f_{UDP,critical}$ and $f_{TCP,critical}$ respectively. Otherwise the parameter variation process can be suppressed in embodiments of the invention. For example, in the preferred embodiment detailed below, the variation of $D_i^{UDP}$ values is suppressed when the total offered rate of the UDP flows $\leq f_{UDP,critical}$ as defined above.

During periods when the normal parameter control procedure is suppressed, the value of $D_i$ might be maintained at its last-calculated value as described above, or it could be set to zero. In the former case there is a potential disadvantage in that the UDP traffic could be reduced still further due to a high amount of TCP traffic (i.e. no excess bandwidth). In the latter case on the other hand, the system could be abused to push high amounts of non-responsive traffic through the device. Thus, in preferred embodiments the adjustment controller 6 reduces the value of $D_i$ by a predetermined amount after each control period $\Delta t$ while normal parameter control is suppressed. That is, controller 6 progressively steps down the value of $D_i$ during suppression periods. For example, the value of $D_i$ may be stepped down by a particular percentage, such as 10% for example, after each period $\Delta t$ during suppression. Since the control period $\Delta t$ is typically much longer than the control period dt of the queue management process, stepping down the value of $D_i$ during suppression periods provides some fairness to honest low amounts of non-responsive traffic. Therefore it is no longer attractive to abuse the system because, in order to benefit from a period of overshoot, long periods of low throughput have to be accepted.

In general, limitation of the $D_i$ values and suppression of the control procedure as described provides significantly improved flow control, avoiding integration loops resulting in inappropriate $D_i$ values, improving the operation for small amounts of non-responsive traffic, and with oscillating offered loads, and countering intentions to abuse the system so as to obtain unfair advantage in terms of transported share. A particular example of a flow control system which incorporates various preferred features discussed above will now be described, and the operation compared with a basic BAT flow control scheme without the parameter control process.

Figure 8:
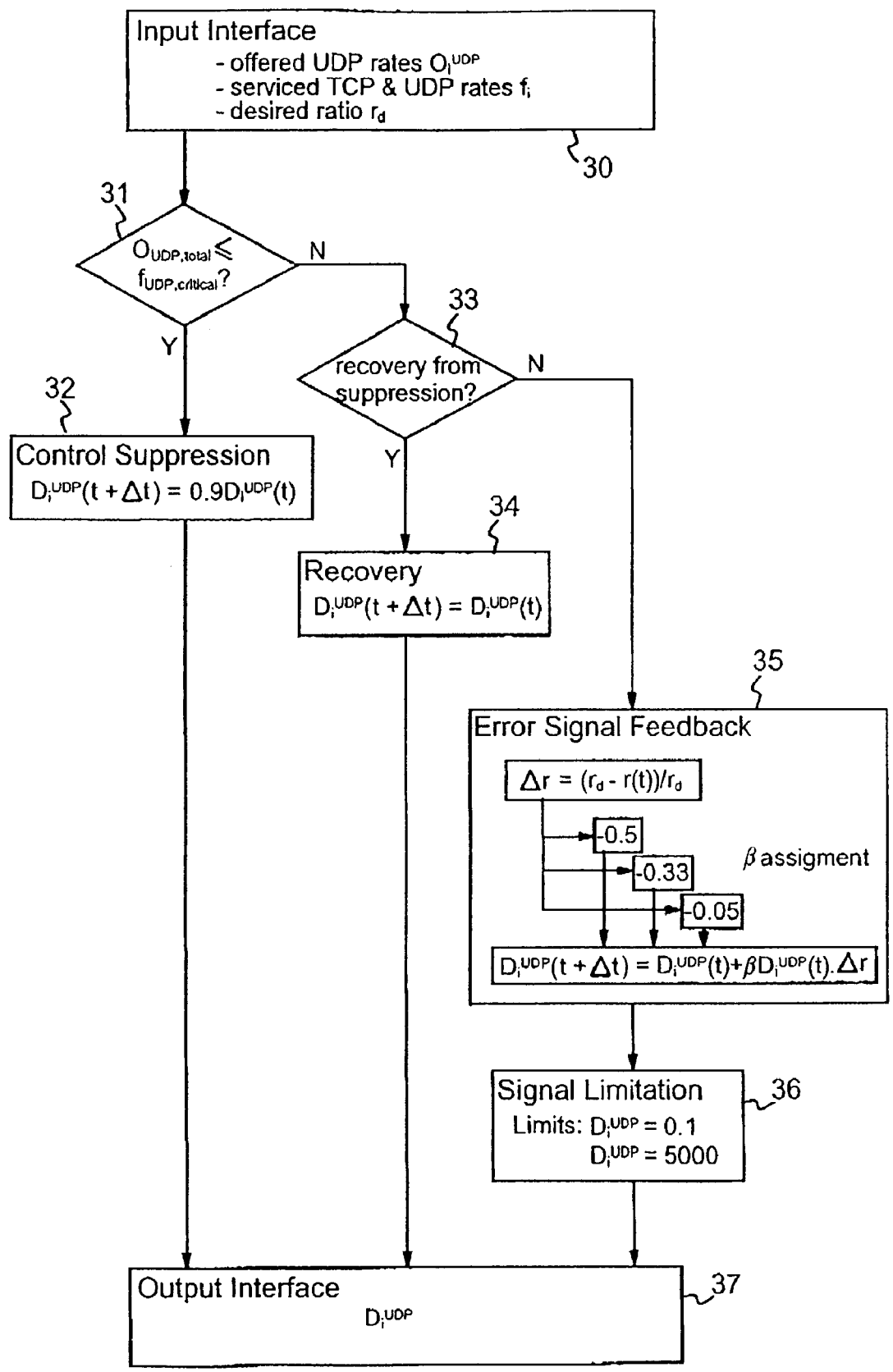
FIG. 8 is a schematic representation of the adjustment controller operation in another embodiment of the flow control system.

FIG. 8 is a schematic representation of the operation of the adjustment controller 6 in the example to be described, where a mix of UDP and TCP flows are assumed as in FIG. 1. In this example, the control period $\Delta t$ in adjustment controller 6 is 1 s, while the queue manager 5 is calculates transmit fractions every 4 ms. Controller 6 measures the ratio between the serviced UDP and TCP rates once every 0.1 s, averaging ten values over the control period $\Delta t$ to obtain a low-pass effect. The inputs to the adjustment controller are indicated in the input interface block 30 of the figure. In this embodiment the adjustment controller receives the offered UDP rates $O_i^{UDP}$ from queue manager 5 as well as the serviced rates $f_i$. As with the serviced rates, the offered rates $O_i^{UDP}$ are sampled periodically and averaged over the control period. Blocks 31 to 36 represents the steps performed for the set of UDP flows at the end of each control period $\Delta t$. Thus, step 31 represents the test for suppression of the control procedure, the test employed here being $O_{UDP,total}\leq f_{UDP,critical}$, where $f_{UDP,critical}=r_d$ * maximal link bandwidth/$(1+r_d)$ as discussed above. If the suppression condition is satisfied then parameter variation for the UDP flows is suppressed as indicated in block 32, and the old value of $D_i^{UDP}$ for each flow is stepped down by 10%. If the suppression condition is not satisfied at step 31, then in step 33 the controller checks whether this is the first adjustment cycle following a period of suppression. If so, then the recovery value of $D_i^{UDP}$ for each flow is its last-calculated value as indicated in step 34. If the current cycle is not a recovery from suppression at step 33, then the new $D_i^{UDP}$ value for each flow is calculated as indicated in step 35 based on the error signal $\Delta r$ generated for the current cycle. Note that three different values for the parameter β are employed in this embodiment. The particular value of β selected depends on the absolute value of the error signal Δr in the current cycle. In particular, in this example β is set as follows:

| | | |
|---|---|---|
| β = 0.5 | if | Δr² > 0.01 |
| 0.33 | else if | Δr² > 0.1 |
| 0.05 | otherwise. | |

Step 36 then imposes the indicated upper and lower limits on the new values of $D_i^{UDP}$ calculated in step 35. From step 32, 34 or 36 as appropriate, the new $D_i^{UDP}$ value for each UDP flow is then output to the queue manager as indicated by the output interface block 37.

To demonstrate the effectiveness of the above system, we use identical simulation setups except that one uses the basic BAT queue management system alone, and the other uses the flow control system of the present embodiment with BAT queue management in queue manager 5 and the adjustment controller 6 implementing the parameter control of FIG. 8. The simulation setup is as follows:

one bottleneck link with 100 Mbits/s;
one UDP flow with a constant bit-rate of 90 Mbits/s; and
one greedy TCP flow.

Figure 9A:
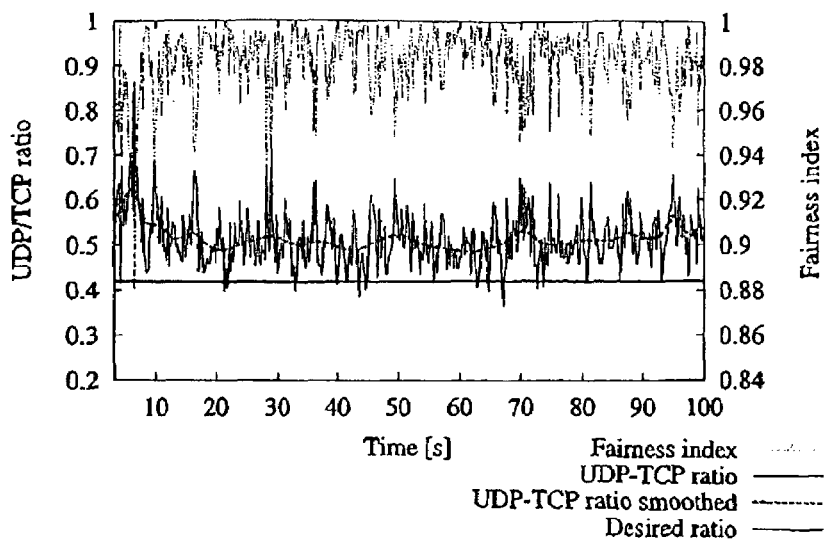
FIGS. 9a and 9b show the results of a first simulation with the embodiment of FIG. 8.
Figure 9B:
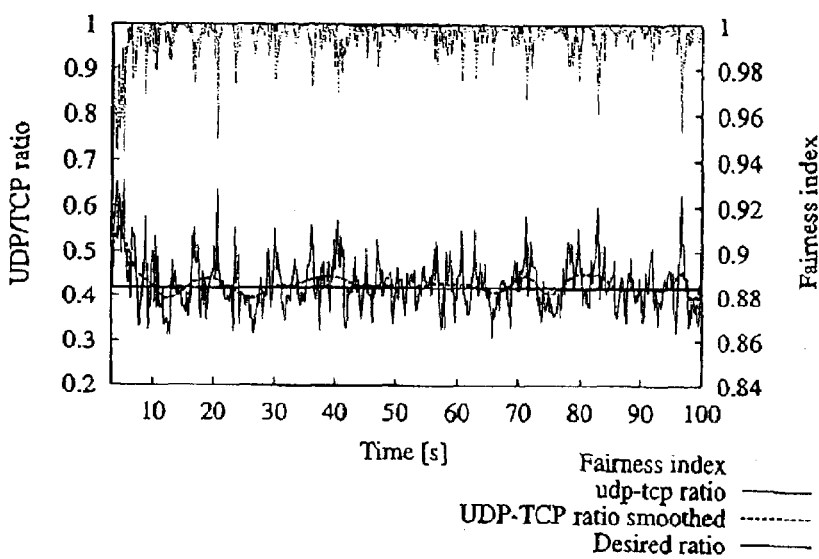

The adjustment controller 6 is set to allocate link bandwidth with a desired ratio $r_d$ of 30/70≅0.42 (UDP/TCP). The results are shown in FIGS. 9a and 9b, where FIG. 9a shows the result for the basic BAT scheme and FIG. 9b the result for the present embodiment of the invention. FIG. 9a clearly demonstrates the unacceptable difference between the desired and actual ratios using the basic BAT scheme with both responsive and non-responsive flows. This behavior is also apparent from the spread of the fairness index. (The fairness index is defined in "The Art of Computer Systems Performance Analysis", Raj Jain, Wiley 1991, and is given here by:

$$Fairness=(x_1/w_1+x_2/w_2)^2/(2*((x_1/w_1)^2+(x_2/w_2)^2))$$

where $x_1$, $x_2$ are the measured rates $f_i(t)$ and $w_1$, $w_2$ are weights given by $w_1=r_d/(1+r_d)$ and $w_2=1/(1+r_d)$). The improvement provided by the flow control system embodying the invention is clearly evident from FIG. 9b. Although the UDP/TCP ratio r(t) is still fluctuating, it now jitters around the desired ratio, and the average is at a very good value. The improvement is also reflected in the fairness index which is much tighter than in FIG. 9a.

The above embodiment has also been tested in conditions of bouncing UDP offered load. The simulation setup described above was altered in that:

there is still one UDP flow but its bit-rate is bouncing between constant bit-rates of 50 Mbits/s and 120 Mbits/s in time steps of 5 s;
the desired UDP/TCP ratio $r_d$ is set at 0.4.

Figure 10A:
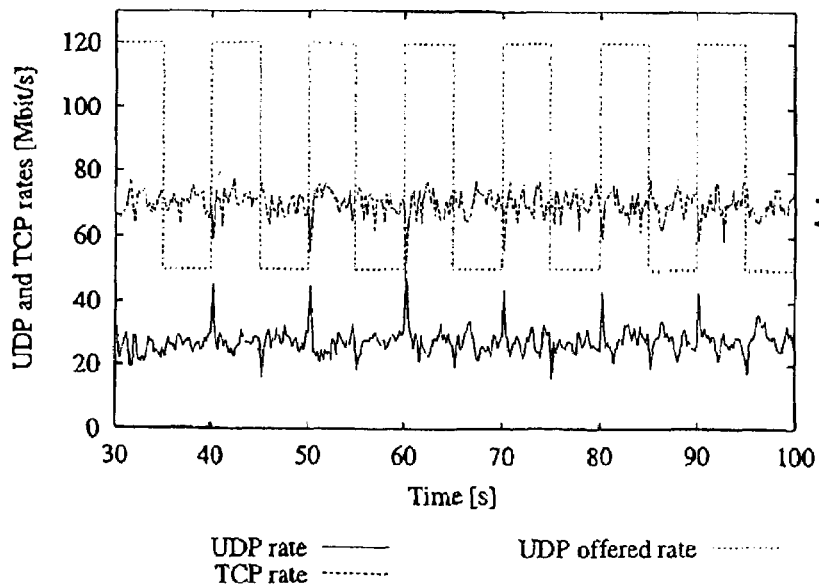
FIGS. 10a and 10b show the results of a second simulation with the embodiment of FIG. 8.
Figure 10B:
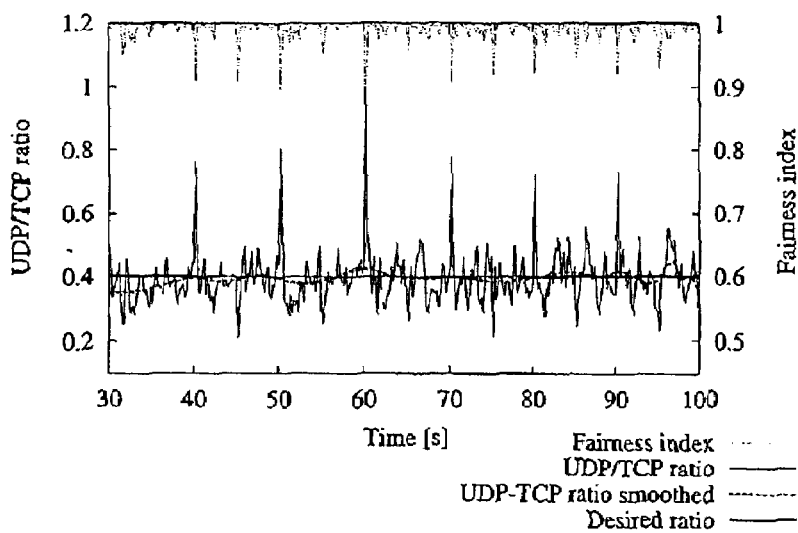

The results of this simulation are presented in FIGS. 10a and 10b. The plots here start at t=30 s, when the controller has adjusted itself to the system over the startup phase. In FIG. 10a, the UDP and TCP serviced rates are represented beside the UDP traffic pattern. FIG. 10b compares the actual and desired UDP/TCP ratios and also shows the fairness index. It is clear from these figures that the present flow control system is effective even in the presence of more complicated traffic patterns. While short spikes are present in FIG. 9b, the situation rapidly returns to normal.

Figure 11A:
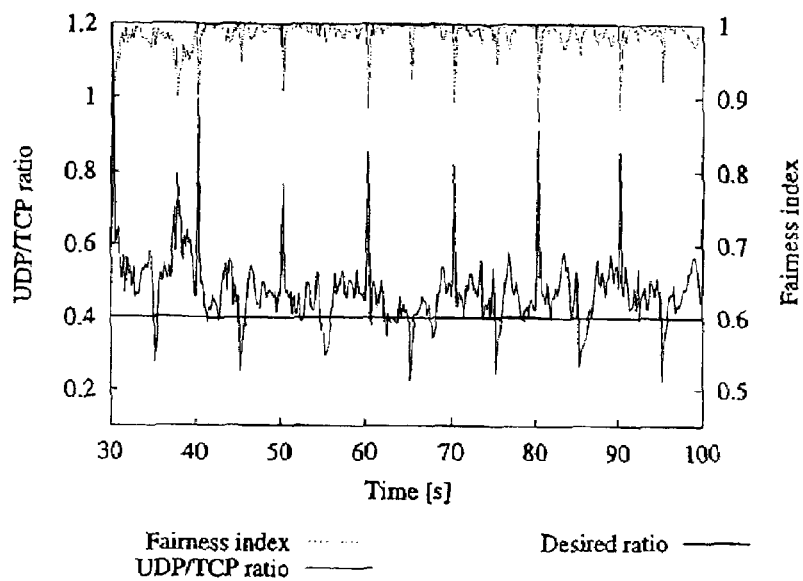
FIGS. 11a and 11b show the results of a third simulation with the embodiment of FIG. 8.
Figure 11B:
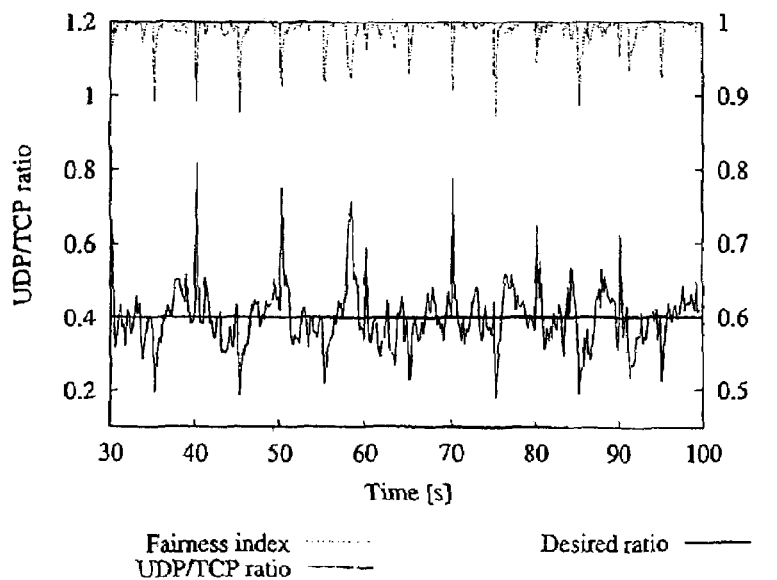

A final simulation demonstrates the versatility and robustness of the present flow control system. The simulation setup is the same as that for FIGS. 10a and 10b, but now uses Pareto-On/Off-distributed TCP flows as discussed in the Raj Jain text referenced above. FIG. 11a shows the results using the basic BAT scheme alone, and FIG. 11b the results with the present flow control system. Once again the present flow control system clearly outperforms the BAT scheme.

In general, the desired allocation ratio $r_d$ can be set by operator at an appropriate value for a given flow control system and suitable values will be apparent to those skilled in the art. In particular, an appropriate value in a given case can generally be determined as a function of the assured rates $f_i$min and $f_i$max in the system. In addition, the starting value for each decrease parameter $D_i^{UDP}$ of the non-responsive flows could be set on the basis of the constant $D_i$ values calculated in the usual way for the basic BAT scheme. However, in particular embodiments of the invention, the initial $D_i^{UDP}$ values may be set based on heuristic observation of a hyperbolic coherence between the desired ratio $r_d$ and the initial values of $D_i^{UDP}$. In particular, the initial $D^{iUDP}$ values may be set according to:

$$D_i^{UDP}(t=0)=constant/r_d$$

where the constant may be set for all non-responsive flows. Again, suitable values will be apparent to those skilled in the art. While this provides acceptable results, improved performance can be achieved where the adjustment controller 6 selects the initial $D_i^{UDP}$ values from an empirically obtained curve of the relationship between $r_d$ and $D_i^{UDP}$ values with an open-loop control scheme based on the basic BAT scheme. These values can be provided in a lookup table for use by adjustment controller 6. The $D_i^{TCP}$ values can be set to the default values known from the basic BAT scheme.

It will be apparent from the foregoing that highly efficient flow control is provided by embodiments of the invention, allowing fair allocation of bandwidth even in difficult traffic situations with a mix of responsive and non-responsive flows. Moreover, in the preferred embodiments discussed above, this is achieved by varying only a single adjustment parameter for the non-responsive flows. In addition, since the parameter variation control can be performed on a much slower time scale than the underlying queue management scheme, the parameter control lends itself particularly well to software implementations.

While particular embodiments have been described by way of example above, many changes and modifications to these embodiments can of course be envisaged. By way of example, while suppression of the parameter control procedure is based on minimum threshold rates in the above embodiments, a mechanism for suppressing the parameter control procedure when maximum guaranteed rates are exceeded could also be provided if desired. As a further example, in the above systems, either or both of the parameters $D_i$ and $C_i$, for either or both of the responsive and non-responsive flow sets, could be adjusted appropriately to reduce the error signal. Adjustment of a single adjustment parameter for only one set of flows is nonetheless preferred for simplicity of implementation. Queue management schemes other than BAT may also be employed in embodiments of the invention, and the adjustment parameter(s) controlled by the parameter variation process selected as appropriate. Also, packets may be marked rather than dropped by queue manager 5. In this case, those packets which would have been dropped are simply marked to indicate congestion, and transmitted into the queue along with the unmarked packets. Here, therefore, it is effectively the flow rate into the queue (i.e. the serviced rate) of unmarked packets that is controlled via adjustment of transmit fractions in the queue manager. Further, while TCP and UDP flows are used above as convenient examples of responsive and non-responsive flows, methods embodying the invention can of course be applied with other protocol flows. The parameter variation process may also utilize other basic control equations than those specifically mentioned above. Moreover, in general more than one queue may be controlled by flow control methods embodying the invention, with separate instances of the flow control system being provided for respective queues. Many other changes and variations can be made to the foregoing embodiments within the spirit and scope of the present invention.

We claim:

1. A method for controlling flow rates of a plurality of data packet flows into a queue corresponding to a resource of a network device, said plurality of flows comprising a set of non-responsive flows and a set of other flows, the method comprising:

managing said flow rates in accordance with a queue management scheme such that adjustments are made to each flow rate in dependence on excess bandwidth in the resource, the amounts of said adjustments being dependent on one or more adjustment parameters for each flow;

generating an error signal dependent on a difference between a desired allocation ratio and the ratio of the total serviced flow rates for the set of non-responsive flows to the total serviced flow rates for the set of other flows; and varying at least one adjustment parameter for at least one flow of at least one of said sets in dependence on the error signal so as to reduce said deviation.

2. A method according to claim 1 wherein said other flows comprise responsive flows.

3. A method according to claim 1 wherein at least one adjustment parameter for each flow of only one of said sets is varied in dependence on the error signal.

4. A method according to claim 1 wherein a single adjustment parameter for each flow of only one of said sets is varied in dependence on the error signal.

5. A method according to claim 1 wherein the flow rates are periodically adjusted with a first period in accordance with said queue management scheme, and wherein said adjustment parameter is varied periodically with a second period greater than the first period.

6. A method according to claim 1 wherein:

in accordance with said queue management scheme, each flow rate is increased by an amount dependent on an increase parameter when excess bandwidth is available, and decreased by an amount dependent on a decrease parameter when excess bandwidth is not available; and at least one of the increase and decrease parameters for at least one flow of at least one of said sets is varied in dependence on the error signal.

7. A method according to claim 6 wherein the queue management scheme comprises the BAT scheme.

8. A method according to claim 6 wherein the decrease parameter for at least one flow of the set of non-responsive flows is varied in dependence on the error signal.

9. A method according to claim 8 wherein the decrease parameter for each flow of the set of non-responsive flows is varied in dependence on the error signal.

10. A method according to claim 9 wherein the flow rates are periodically adjusted with a first period in accordance with said queue management scheme, and wherein the decrease parameter is varied periodically with a second period greater than the first period.

11. A method according to claim 9 including applying a maximum limiting value to the variation of the decrease parameter for each flow.

12. A method according to claim 11 including calculating the maximum limiting value for a flow as a function of an input flow rate to the flow rate management step for that flow.

13. A method according to claim 9 wherein, in accordance with said queue management scheme, the adjustment of a flow rate in dependence on excess bandwidth is performed when the flow rate exceeds a minimum assured rate for the flow, and wherein the method includes suppressing the variation of the decrease parameter for said flow when an input flow rate to the flow rate management step for that flow is below said minimum assured rate for the flow.

14. A method according to claim 13 including, during suppression of said variation of the decrease parameter, maintaining the decrease parameter at the value thereof on commencement of the suppression.

15. A method according to claim 13 wherein the decrease parameter is varied at periodic time intervals in dependence on the error signal, the method including, during suppression of said variation of the decrease parameter, reducing the decrease parameter by a predetermined amount after each said time interval.

16. A method according to claim 9 including suppressing the variation of the decrease parameter for said flow when a total input flow rate to the queue management step for the set of non-responsive flows is below a threshold value dependent on said desired allocation ratio and a predetermined maximal link bandwidth for said queue.

17. A method according to claim 16 including, during suppression of said variation of the decrease parameter, maintaining the decrease parameter at the value thereof on commencement of the suppression.

18. A method according to claim 16 wherein the decrease parameter is varied at periodic time intervals in dependence on the error signal, the method including, during suppression of said variation of the decrease parameter, reducing the decrease parameter by a predetermined amount after each said time interval.

19. A method according to claim 9 including commencing the variation of the decrease parameter from a predetermined initial value which is inversely proportional to said desired allocation ratio.

20. A method according to claim 9 including, on commencing the variation of the decrease parameter, selecting an initial value for the decrease parameter in dependence on said ratio of the total flow rates.

21. Apparatus for controlling flow rates of a plurality of data packet flows into a queue corresponding to a resource of a network device, said plurality of flows comprising a set of non-responsive flows and a set of other flows, the apparatus comprising:

a queue manager for managing said flow rates in accordance with a queue management scheme such that adjustments are made to each flow rate in dependence on excess bandwidth in the resource, the amounts of said adjustments being dependent on one or more adjustment parameters for each flow; and an adjustment controller for controlling at least one adjustment parameter for at least one flow of at least one of said sets, the adjustment controller being arranged to generate an error signal dependent on a difference between a desired allocation ratio and the ratio of the total serviced flow rates for the set of non-responsive flows to the total serviced flow rates for the set of other flows into the queue for said sets of flows, and to vary said at least one adjustment parameter in dependence on the error signal so as to reduce said deviation.

22. Apparatus according to claim 21 wherein the adjustment controller is arranged to vary at least one adjustment parameter for each flow of only one of said sets in dependence on the error signal.

23. Apparatus according to claim 21 wherein the adjustment controller is arranged to vary a single adjustment parameter for each flow of only one of said sets in dependence on the error signal.

24. Apparatus according to claim 21 wherein the queue manager is arranged to manage said flow rates in accordance wit a queue management scheme wherein the flow rates are periodically adjusted with a first period, and wherein the adjustment controller is arranged to vary said adjustment parameter periodically wit a second period greater tan the first period.

25. Apparatus according to claim 21 wherein:
the queue manager is arranged to manage said flow rates in accordance with a queue management scheme wherein each flow rate is increased by an amount dependent on an increase parameter when excess bandwidth is available, and decreased by an amount dependent on a decrease parameter when excess bandwidth is not available; and
the adjustment controller is arranged to vary at least one of the increase and decrease parameters for at least one flow of at least one of said sets in dependence on the error signal.

26. Apparatus according to claim 25 wherein the queue management scheme comprises the BAT scheme.

27. Apparatus according to claim 25 wherein the adjustment controller is arranged to vary the decrease parameter for at least one flow of the set of non-responsive flows in dependence on the error signal.

28. Apparatus according to claim 27 wherein the adjustment controller is arranged to vary the decrease parameter for each flow of the set of non-responsive flows in dependence on the error signal.

29. Apparatus according to claim 28 wherein the queue manager is arranged to manage said flow rates in accordance wit a queue management scheme wherein the flow rates are periodically adjusted with a first period, and wherein the adjustment controller is arranged to vary the decrease parameter periodically with a second period greater than the first period.

30. Apparatus according to claim 28 wherein the adjustment controller is arranged to apply a maximum limiting value to the variation of the decrease parameter for each flow.

31. Apparatus according to claim 30 wherein the adjustment controller is arranged to calculate the maximum limiting value for a flow as a function of an input flow rate to the queue manager for that flow.

32. Apparatus according to claim 28 wherein:
the queue manager is arranged to manage said flow rates in accordance with a queue management scheme wherein the adjustment of a flow rate in dependence on excess bandwidth is performed when the flow rate exceeds a minimum assured rate for the flow; and
the adjustment controller is arranged to suppress the variation of the decrease parameter for said flow when an input flow rate to the queue manager for that flow is below said minimum assured rate for the flow.

33. Apparatus according to claim 32 wherein the adjustment controller is arranged such that, during suppression of said variation of the decrease parameter, the adjustment controller maintains the decrease parameter at the value thereof on commencement of the suppression.

34. Apparatus according to claim 32 wherein the adjustment controller is arranged to vary the decrease parameter at periodic time intervals in dependence on the error signal, and, during suppression of said variation of the decrease parameter, to reduce the decrease parameter by a predetermined amount after each said time interval.

35. Apparatus according to claim 28 wherein the adjustment controller is arranged to suppress the variation of the decrease parameter when a total input flow rate to the queue manager for the set of non-responsive flows is below a threshold value dependent on said desired allocation ratio and a predetermined maximal link bandwidth for said queue.

36. Apparatus according to claim 35 wherein the adjustment controller is arranged such that, during suppression of said variation of the decrease parameter, the adjustment controller maintains the decrease parameter at the value thereof on commencement of the suppression.

37. Apparatus according to claim 35 wherein the adjustment controller is arranged to vary the decrease parameter at periodic time intervals in dependence on the error signal, and, during suppression of said variation of the decrease parameter, to reduce the decrease parameter by a predetermined amount after each said time interval.

38. Apparatus according to claim 28 wherein the adjustment controller is arranged to commence the variation of the decrease parameter from a predetermined initial value which is inversely proportional to said desired allocation ratio.

39. Apparatus according to claim 28 wherein the adjustment controller is arranged to select, on commencing the variation of the decrease parameter, an initial value for the decrease parameter in dependence on said ratio of the total flow rates.

40. A network device for processing data packets in a communications network, the device having a resource which is associated with a queue of data packets, and flow control logic for controlling flow rates of a plurality of data packet flows, comprising a set of non-responsive flows and a set of other flows, into the queue, the flow control logic comprising:
a queue manager for managing said flow rates in accordance with a queue management scheme such that adjustments are made to each flow rate in dependence on excess bandwidth in the resource, the amounts of said adjustments being dependent on one or more adjustment parameters for each flow; and
an adjustment controller for controlling at least one adjustment parameter for at least one flow of at least one of said sets, the adjustment controller being arranged to generate an error signal dependent on a difference between a desired allocation ratio and the ratio of the total serviced flow rates for the set of non-responsive flows to The total serviced flow rates for the set of other flows into the queue for said sets of flows, and to vary said at least one adjustment parameter in dependence on the error signal so as to reduce said deviation.

41. A computer program product comprising a computer usable medium having embodied therein computer readable program code for causing a processor of a network device, having a resource which is associated with a queue of data packets, to perform a flow control method for controlling flow rates of a plurality of data packet flows, comprising a set of non-responsive flows and a set of other flows, into the queue, the flow control method comprising:

managing said flow rates in accordance with a queue management scheme such that adjustments are made to each flow rate in dependence on excess bandwidth in the resource, the amounts of said adjustments being dependent on one or more adjustment parameters for each flow;

generating an error signal dependent on a difference between a desired allocation ratio and The ratio of the total serviced flow rates for the set of non-responsive flows to the total serviced flow rates for the set of other flows into the queue for said sets of flows; and varying at least one adjustment parameter for at least one flow of at least one of said sets in dependence on the error signal so as to reduce said deviation.

* * * * *